United States Patent [19]

Sato et al.

[11] Patent Number: 5,403,513
[45] Date of Patent: Apr. 4, 1995

[54] TITANIUM OXIDE SOL AND PROCESS FOR PREPARATION THEREOF

[75] Inventors: Goro Sato; Yusaku Arima; Hirokazu Tanaka; Shiyuichi Hiraoka, all of Fukuoka, Japan

[73] Assignee: Catalyst & Chemical Industries, Co., Ltd., Tokyo, Japan

[21] Appl. No.: 86,455

[22] Filed: Jul. 6, 1993

Related U.S. Application Data

[63] Continuation of Ser. No. 552,801, Jul. 12, 1990, abandoned, which is a continuation-in-part of Ser. No. 159,289, Feb. 23, 1988, abandoned.

[30] Foreign Application Priority Data

Oct. 7, 1987 [JP] Japan .................... 62-252953

[51] Int. Cl.$^6$ .............................. B01J 13/00
[52] U.S. Cl. ..................... 252/309; 252/313.1; 423/612; 106/437; 106/286.4; 424/59
[58] Field of Search ............. 423/612; 106/437, 286.4, 106/287.19; 252/309, 313.1, 315.5; 424/59

[56] References Cited

U.S. PATENT DOCUMENTS

| | | | |
|---|---|---|---|
| 2,147,533 | 2/1939 | Katzoff et al. | 252/313.2 |
| 3,579,310 | 5/1971 | Lewis et al. | 23/301 |
| 3,663,283 | 5/1972 | Herbert et al. | 106/437 X |
| 3,923,968 | 12/1975 | Basque et al. | 423/611 OR |
| 4,166,147 | 8/1979 | Lange et al. | 252/310 X |
| 4,576,921 | 3/1986 | Lane | 252/313.1 X |
| 4,612,138 | 9/1986 | Keiser | 252/313.2 |
| 4,880,703 | 11/1989 | Sakamoto et al. | 106/436 X |
| 4,927,464 | 5/1990 | Cowie | 106/436 |
| 5,049,309 | 9/1991 | Sakamoto et al. | 252/313.1 |
| 5,149,519 | 9/1992 | Chopin et al. | 423/612 X |
| 5,215,580 | 6/1993 | Elfenthal et al. | 106/441 OR |

OTHER PUBLICATIONS

Derwent Abstract, 87-295756/42 (corresponding to J62-207718-A, 87.12.9)
Derwent Abstract, 88-024284/04 (corresponding to J62-283817-A, 87.12.9)

Primary Examiner—Robert L. Stoll
Assistant Examiner—Daniel S. Metzmaier
Attorney, Agent, or Firm—Wenderoth, Lind & Ponack

[57] ABSTRACT

A titanium oxide sol comprising a disperse medium and generally rectangular, non-spherical particles of titanium oxide dispersed in the disperse medium, with narrow scatteres in particle size and configuration. The sol is excellent in dispersibility, long-term stability and light-resistance and, is stable in a wide pH range without causing agglomeration. Moreover, it is excellent in absorbance of ultraviolet ray and in transmittance of visible light. The sol may be prepared by a process wherein hydrogen peroxide is added to a gel or sol of hydrated titanium oxide to dissolve the hydrated titanium oxide in said gel or sol, and the resulting aqueous titanic acid solution is heated in the presence of at least one compound selected from inorganic compounds of metals belonging the Group II, III, IV, V, VI and VIII of the periodic table.

3 Claims, 5 Drawing Sheets

TITANIUM OXIDE SOL AND PROCESS FOR PREPARATION THEREOF

RELATED APPLICATION.

This is a continuation of application Ser. No. 07/552,801, filed Jul. 12, 1990, which in turn is a continuation-in-part application to application Ser. No. 07/159,289, filed on Feb. 23, 1988, both cases of which are now abandoned.

FIELD OF THE INVENTION

This invention relates to titanium oxide sol and a process for preparing the same and more particularly to a titanium oxide sol in which titanium oxide particles having a specific uniform configuration and a uniform size are stably dispersed in a disperse medium and a process for preparing the same.

BACKGROUND OF THE INVENTION

In recent years, by virtue of utilizing its useful chemical characteristics, titanium oxide has come to be used for various purposes. For instance, because titanium oxide has appropriate bonding power to oxygen as well as acid resistance, it is used as an oxidation or reduction catalyst, or used as a cosmetic material or surface coating material for plastics by utilizing its ultraviolet shielding characteristics, or used as a reflection-preventing coating material by utilizing its high refraction index. Further by virtue of a combination of these effects mentioned above, titanium oxide is used as a functional hard coating material and the like.

As stated above, titanium oxide is used for a variety of uses and in every case it is required to perform many functions. For instance, where titanium oxide is used as a catalyst, it is required to have not only activity on the main reaction but also selectivity, mechanical strength, heat resistance and acid resistance or service durability, and where titanium oxide is used as a cosmetic material, it is required to have not only an ultraviolet shielding effect but also smoothness, texture and transparency. Furthermore, where titanium oxide is used as a coating material, it is required to have excellent film forming properties, adhesive properties, film hardness, mechanical strength and abrasion resistance in addition to transparency and high refraction index.

As explained above, titanium oxide particles are used for various purposes and are required to have specific characteristics in accordance with the purpose for which they are used. In every case, however, the titanium oxide particles used are preferably ultrafine. Where the titanium oxide particles used are required to have transparency, it is essential that they not only are of uniform shape and size but also they are highly dispersible when incorporated into disperse media. To prepare such titanium oxide particles as satisfying these characteristics, it is preferable to use highly dispersed colloidal titanium oxide (titanium oxide sol).

Heretofore known as a process for preparing such titanium oxide sol as referred to above is the process wherein metatitanic acid obtained by hydrolysis of an aqueous salt of titanium solution is neutralized, followed by washing [deflocculation method of washed gel], or the process wherein an aqueous salt of titanium solution is deionized with ion exchange resins or the like to obtain a sol.

However, such processes for preparing titanium oxide sol as illustrated above involve problems as mentioned below.

(1) Because particles dispersed in a sol are of spherical or pseudospherical agglomerates and are not uniform in particle diameter, the sol becomes opaque white and is poor in transparency.

(2) Depending on the conditions employed under which a sol is formed, it is possible to obtain a sol having particles small in particle diameter and excellent in transparency, but, in this case, large amounts of acid as a stabilizer are needed.

(3) The sol is stable only when it is in an acid region (less than pH 3), and hence has its use limited because it forms precipitates, or gels when it is in a neutral or alkaline region.

(4) When the sol is mixed with an organic solvent or substituted therewith, it becomes unstable and forms precipitates, and hence the sol thus treated is difficult to use as a hard coating material to be applied to the surface of plastics or the like.

(5) Because particles present in the sol assume spherical or pseudospherical configuration, when it is used as a coating, for example, by mixing it with a base resin, the titanium oxide particles are not present densely in the coating thus formed, leaving spaces among the particles, and the density of the particles cannot be enhanced, and hence the coating obtained is poor in characteristics and strength as coating.

The present inventors conducted extensive research with the view of solving such problems as mentioned above, eventually accomplishing the present invention on the basis of their finding that if titanium oxide sol is prepared by a specific process, there can be obtained a titanium oxide sol having dispersed in a disperse medium the titanium oxide particles having such a specific shape as could not be obtained by the prior art processes for the preparation of titanium oxide sol, and the titanium oxide particles obtained in the titanium oxide sol prepared according to this specific process have various excellent characteristics.

SUMMARY OF THE INVENTION

The invention provides a titanium oxide sol which comprises a disperse medium and generally rectangular, non-spherical particles of titanium oxide dispersed in the disperse medium, each particle of said titanium oxide having a major axis of a length L ranging from 4 to 500 m$\mu$ and a minor axis of a length D ranging from 4 to 100 m$\mu$ with the proviso that L is not smaller than D, said particles having such a size distribution that a value of $(\sigma/L_A) \times 100$ is not in excess of 30 (%) wherein $L_A$ is an average value of L and $\sigma$ is a standard deviation of L and such a configuration distribution that at least 60% of all the particles have a value of L/D within the range between $(1-0.3) \times [L/D]_A$ and $(1+0.3) \times [L/D]_A$ wherein $[L/D]_A$ is an average value of L/D of all the particles.

The invention further provides a process for preparing the above-mentioned titanium oxide sol wherein hydrogen peroxide is added to a gel or sol of hydrated titanium oxide to dissolve the hydrated titanium oxide in said gel or sol, and the resulting aqueous titanic acid solution is heated in the presence of at least one inorganic compound of an element selected from elements belonging to Group II, III, IV, V, VI and VIII of the periodic table.

The titanium oxide sol according to the invention, in which titanium oxide particles having a specific uniform configuration and a uniform size are stably dispersed in a disperse medium such as water, is excellent in dispersibility, long-term stability and light-resistance and, at the same time, is stable in a wide pH range without causing agglomeration. Moreover, it is excellent in absorbance of light of wavelength in the ultraviolet region as well as in transmittance of light of wavelength in the visible region.

DETAILED DESCRIPTION OF THE INVENTION

Figure 1:
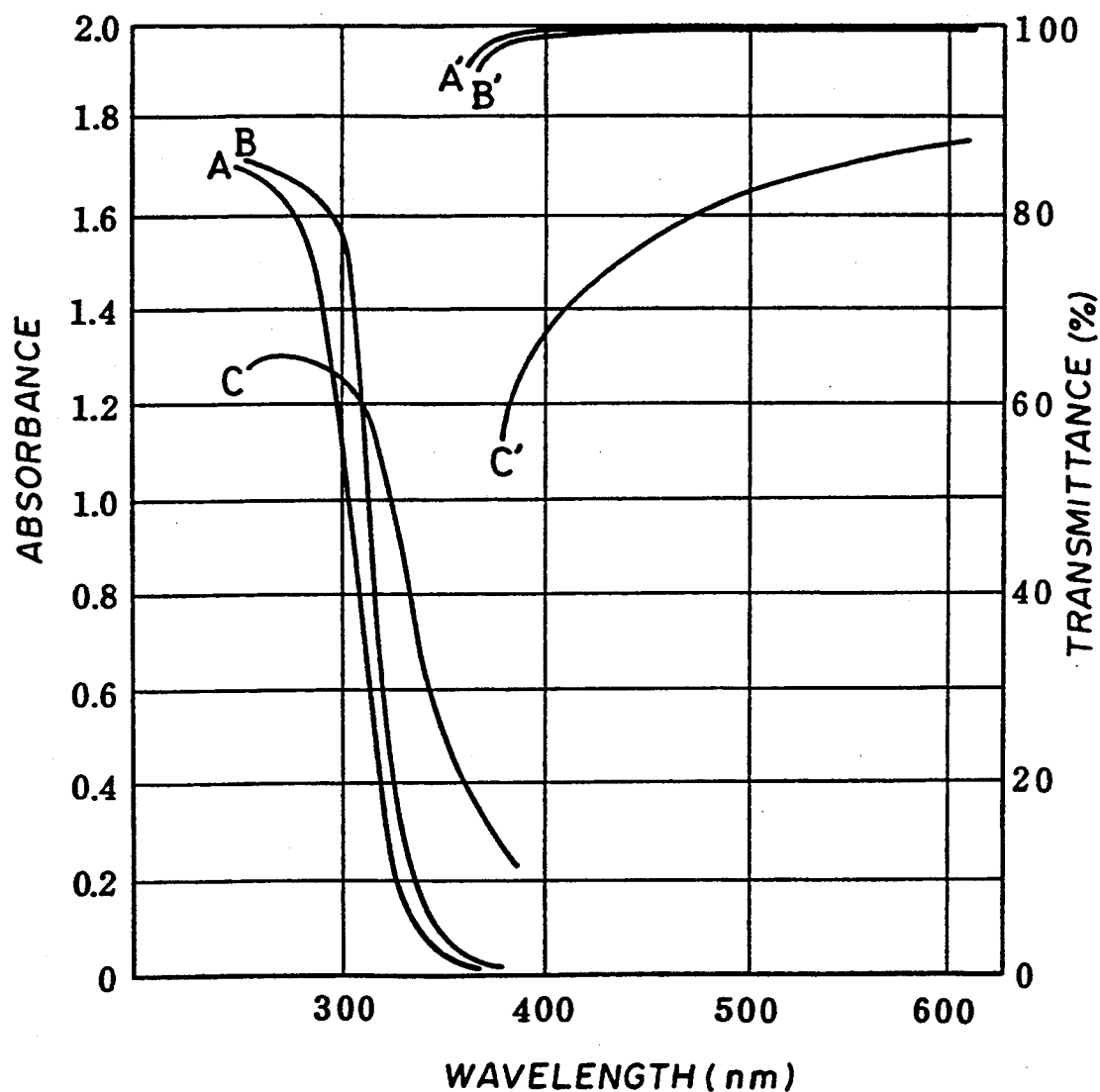
FIG. 1 is a graph showing absorbance and transmittance of the titanium oxide sols of the present invention and of a commercially available dispersion of titanium oxide particles, wherein A, B, A' and B' are those of the titanium oxide sols of the present invention and C and C' are those of the commercially available dispersion of titanium oxide particles.

The titanium oxide sol of the present invention is illustrated below in more detail.

The titanium oxide particles present in the titanium oxide sol of the present invention are fine particles having a specific uniform, generally rectangular, non-spherical configuration, which fine particles have a major axis of a length L ranging from 4 to 500 m$\mu$ and a minor axis of a length D ranging from 4 to 100 m$\mu$ with the proviso that L is not smaller than D, and are not of agglomerate but are of grown anatase crystal particles or a congregated mass thereof.

The length L of the major axis and the length D of the minor axis of titanium oxide particle are determined in the following manner. That is, the titanium oxide particle is observed under an electron microscope, wherein the largest length of the particle in the lengthwise direction is taken as L, and the length of the particle in the direction perpendicular at the point of the length L/2 of the particle in to the lengthwise direction is taken as D.

In the titanium oxide sols according to the invention, the particle size, that is, the length L of the major axis in the lengthwise direction and the length D of the minor axis in the transverse direction of the titanium oxide particle dispersed in a disperse medium such as water will vary from one sol to another, as will be stated later, depending on the conditions employed, under which the sol is prepared. A particular sol prepared by the process according to the invention, however, exhibits a narrow scatter in particle size. More precisely, the fine titanium oxide particles in a given sol according to the invention have such a particle size distribution that a value of $(\sigma/L_A) \times 100$ is not in excess of 30 (%) wherein $L_A$ is an average value of L and $\sigma$ is a standard deviation of L.

In the titanium oxide sols according to the invention, the generally rectangular, non-spherical particle configuration, that is, the ratio of L to D of the titanium oxide particle dispersed in a disperse medium such as water will vary from one sol to another, as will be stated later, depending on the conditions employed, under which the sol is prepared. According to projected views of electron microscope photographs of the fine particles, there are observed square, rectangular and elliptical particles, thus concretely the observed particles are of varied configurations, from one sol to another, including cubic, rectangular parallelopipedon, cylindrical, square pillar, flat plate-like, fibrous and needle-like configurations. A particular sol prepared by the process according to the invention, however, exhibits narrow scatter in particle configuration. More precisely, the fine titanium oxide particles in a given sol according to the invention have such a particle configuration distribution that at least 60%, preferably at least 65%, and more preferably at least 70% of all the particles have a value of L/D within the range between $(1-0.3) \times [L/D]_A$ and $(1+0.3) \times [L/D]_A$ wherein $[L/D]_A$ is an average value of L/D of all the particles.

As stated hereinabove, because titanium oxide particles which are of uniform size and configuration have been well dispersed in a disperse medium, the titanium oxide sol according to the invention is excellent in long-term stability, light resistance, ultraviolet shielding effect and transparency.

In this connection, the titanium oxide sol of the present invention does not form precipitate and is stable even when the sol is mixed with an organic solvent such as alcohol, or the dispersed medium of sol is partly replaced with an organic solvent. Hence, in comparison with the prior art titanium oxide sol, the field of use of the present titanium oxide sol as coating material is greatly enhanced.

The titanium oxide sol of the present invention generally has a pH value of from 5 to 9, and is stable in such a wide pH range from 3 to 11. Hence, even when acid or alkali is added to the sol generally having a pH of from 5 to 9, the sol does not become a gel, nor are any precipitates formed, in so far as the eventual pH is within the range between 3 and 11.

The concentration of titanium oxide particles in the titanium oxide sol may be stably varied over a wide range according to the purpose for which the sol is used. Generally, however, the titanium oxide particles are stably present in the titanium oxide sol even when the sol is concentrated to such a high concentration as about 30% by weight in terms of TiO$_2$, and the concentration of the coexisting salt can be markedly reduced to such a reduced amount as about 0.05% by weight.

The process for preparing titanium oxide sol of the present invention is illustrated hereinafter.

First, a gel or sol of hydrated titanium oxide is prepared by procedures known per se. The hydrated titanium oxide gel can be obtained, for example, by neutralizing an aqueous solution of a titanate such as titanium chloride or titanium sulfate with the addition of alkali. The hydrated titanium oxide sol can be obtained, for example, by passing an aqueous solution of a titanate through an ion exchange resin to remove anions therefrom. To prepare the hydrated titanium oxide sol or gel, there can be widely used not only the above-mentioned procedures but also other procedures known per se. By the term "hydrated titanium oxide" as used herein is meant a general name therefore, including hydrated titanium oxide, titanic acid and titanium hydroxide obtained by such procedures as mentioned above.

Next, to the hydrated titanium oxide sol or gel or a mixture thereof is added hydrogen peroxide to dissolve the hydrated titanium oxide present therein. The resulting mixture is preferably heated at about 50° C. or above, and stirred, if necessary, thereby preparing a homogeneous aqueous solution. In that case, moreover, the use of an excessively high concentration of hydrated titanium oxide is not preferable because a long period of time is required for dissolving the hydrated titanium oxide and, further, undissolved gel precipitates or the resulting aqueous solution becomes excessively viscous. For these reasons, the concentration of the hydrated titanium oxide is desirable less than about 10% by weight, preferably less than about 5% by weight in terms of $TiO_2$.

If the amount of hydrogen peroxide added is at least 1 in terms of $H_2O_2/TiO_2$ weight ratio, the hydrated titanium oxide completely dissolves. The use of the $H_2O_2/TiO_2$ being less than 1 is not preferable since the hydrated titanium oxide does not completely dissolve and unreacted gel or sol remains. Furthermore, the larger is the $H_2O_2/TiO_2$ ratio, the higher is the rate of dissolution of the hydrated titanium oxide, and the reaction terminates in a short period of time. However, the use of a large excess of hydrogen peroxide is not preferable because large amounts of unreacted hydrogen peroxide remain in the system to exert adverse effects on the subsequent step. Accordingly, it is preferable to use hydrogen peroxide in such an amount that the $H_2O_2/TiO_2$ ratio becomes 1 to 6, preferably about 2 to 6. When hydrogen peroxide is used in such an amount as mentioned above, hydrated titanium oxide in the reaction system completely dissolves in about 0.5 to 20 hours.

Subsequently, an aqueous solution obtained by the above-mentioned procedure, in which hydrated titanium oxide has dissolved, providing an aqueous titanic acid solution, is mixed with a predetermined amount of an inorganic compound, and the resulting mixture is heated at 60° C. or above, preferably 80° C. or above to thereby hydrolyze the titanic acid present in the aqueous solution thereof. By virtue of treating the aqueous titanic acid solution in this manner, there is obtained a titanium oxide sol having dispersed therein titanium oxide particles with narrow scatters in particle size and configuration as aforementioned.

Useful inorganic compounds in the present invention include inorganic compounds of metals preferably selected from metals belonging to the group II of the periodic table, such as Zn, those belonging to the group III, such as Al, those belonging to the group IV, such as Ti, Zr, Si and Sn, those belonging to the group V, such as V and Sb, those belonging to the group VI, such as W, and those belonging to the group VIII, such as Fe. These inorganic compounds may be used in the form of salt, oxide, hydrated oxide, hydroxide, oxyacid or salt of oxyacid. The inorganic compounds may be used alone or in combination and may be added in their solid state to the aforesaid aqueous solution of titanic acid or may be mixed therewith as an aqueous solution thereof. In a preferred usage of these inorganic compounds, they are used as gel or sol thereof. In the case of the sol, an average particle size of the particles dispersed therein is less than about 30 m$\mu$, preferably less than about 15 m$\mu$. For instance, in the case where silicon is used as the inorganic compound, there may be used silica gel, silica sol, silicic acid solution, or aqueous solution of alkali silicate. By silicic acid solution as used herein is meant a solution of a low polymerizate of silicic acid obtained by dealkalizing an aqueous solution of alkali silicate by the ion exchange method or the like.

When the amount of the inorganic compounds to be mixed is increased, the resulting titanium oxide sol is improved in long-term stability and light resistance, and the sol in high concentration is obtained. However, after these effects have reached a certain level, the effects of addition of the inorganic compounds such as long-term stability and light resistance cannot be expected any longer even when the amount of the inorganic compounds to be mixed is increased further, and thus this is not preferable.

If the amount of the inorganic compounds to be mixed is decreased, there are brought about such problems that the titanium oxide particles obtained are found to be not uniform in size, or the particles agglomerate with one another.

Taking all these considerations into account, the amount of the inorganic compound and metal to be mixed is preferably such that the $TiO_2/MO$(weight ratio), i.e. the ratio of a value of the weight of titanium oxide in terms of TiO to the weight of the inorganic compound in terms of ($MO_x$) wherein M represents the metal and x is a number depending upon the valency of the metal in the aqueous titanic acid solution, is in the range of from 0.25 to 200.

Furthermore, depending on the $TiO_2/MO_x$ ratio and the ($TiO_2+MO_x$) concentration in the mixed solution, the configuration, particularly the length, of the titanium oxide particles obtained will vary. When the rectangular configuration of titanium oxide particle obtained is represented by L/D, there is observed generally such a tendency that L/D becomes larger with increasing value of $TiO_2/MO_x$. For instance, when $TiO_2/MO_x$ is about 10 to 30, a sol having dispersed therein particles having L/D=about 3 to 6 is obtained, and when $TiO_2/MO_x$ is about 50 to 100, a sol having dispersed therein long particles having L/D=about 10 to 20 is obtained.

As a result of studying the relationship between ($TiO_2+MO_x$) concentration (Y) and L/D (X), it has been recognized that when the concentration (Y) is in the range of Y>0.17 X−1.30, particles having L/D=1 to 2 are obtained, and in the range of Y≦0.17 X−1.30, particles having L/D>2 are obtained.

No particular limitation is placed on the method of mixing the aqueous titanic acid solution with the inorganic compound. That is, predetermined amounts of the aqueous titanic acid solution and the inorganic compound may be mixed together at a time, or a part of said solution and a part of said compound may mixed together at the outset, followed by heating, and the remainder of the two may be added to the system as the reaction proceeds.

Further, there can also be adopted a mixing process, wherein the total amount of the inorganic compound is first mixed with a part of the aqueous titanic acid solution and heated, and thereafter the remainder of the aqueous titanic acid solution is added to the system.

Furthermore, with regard to the point of time at which the inorganic compound is mixed with the aqueous titanic acid solution, said compound is not always necessarily mixed therewith after dissolving in hydrogen peroxide of the hydrated titanium oxide. The inorganic compound may be mixed with the hydrated titanium oxide gel or sol at the stage prior to dissolving the hydrated titanium oxide in hydrogen peroxide, or alternatively the mixing of said inorganic compound may be effected at the time when the gel or sol of hydrated titanium oxide is prepared. In short, it is sufficient that the inorganic compound is present in the reaction system at the time when the aqueous titanic acid solution is hydrolyzed by heating.

Where an aqueous titanic acid solution with which no inorganic compound coexists is heated and hydrolyzed, the titanium oxide sol is formed at least if the titanium oxide concentration in said solution is low. However, the titanium oxide sol thus obtained is quite unstable, for instance, when this sol is concentrated, it cannot exist as a sol any longer and precipitates are formed thereby.

In the present invention, when a titanium compound is used as the inorganic compound to be mixed with the aqueous titanic acid solution, there may be used the starting hydrated titanium oxide gel or sol of the present invention, or a titanium oxide sol (or gel) obtained by heating and hydrolyzing the aqueous titanic acid solution, as it is, without addition of the inorganic compound. In these cases, it is preferable that the hydrated titanium oxide gel or sol is perfectly dissolved in hydrogen peroxide to yield an aqueous titanic acid solution and thereafter the above-mentioned titanium compound is mixed therewith.

The titanium oxide sol obtained in the manner now described can be used, as it is, for the purpose intended. However, this sol can also be used after concentrating it to an appropriate concentration by known methods such as vacuum evaporation, ultrafiltration or the like. Furthermore, according to the purpose for which the titanium oxide sol is used, said titanium oxide sol can also be mixed or substituted with an organic solvent, such as isopropanol, ethylene glycol, etc., to give an organic solvent-dispersed sol adapted for the purpose intended.

EFFECT OF THE INVENTION

The titanium oxide sol of the present invention having dispersed therein titanium oxide particles having a specific shape and uniform in size is excellent in long-term stability and light resistance as well as in dispersibility.

Furthermore, with regard to ultraviolet shielding effect and transparency, the titanium oxide sol of the present invention has excellent characteristics in comparison with conventional titanium particle dispersions, in that the present titanium oxide sol does not gel or does not form precipitates even when mixed or substituted with and organic solvent.

Accordingly, when the titanium oxide sol of the present invention is used as a loading material for plastics, there can be expected various effects such as prevention of deterioration of the plastics caused by ultraviolet rays, and when the present titanium oxide sol is incorporated into plastic sheets for food packaging purposes, the foods packed with such sheets can be preserved for a long period of time as compared with the case of using conventional food packaging film materials.

When the titanium oxide sol of the invention is used as a surface coating material for such transparent base as glass, plastics or the like, there is obtained a coating having a high refractive index, which is excellent in adhesion to the base and, moreover, excellent in transparency and ultraviolet shielding effect.

The titanium oxide sol of the invention also possesses excellent effects as a loading material for cosmetics, for instance, when a water-dispersed titanium oxide sol or an organic solvent-dispersed sol is incorporated in an amount of at least about 0.005% by weight in terms of $TiO_2$ into cosmetics, there are obtained cosmetics excellent in transparency and ultraviolet shielding effect and, in addition, favorable in finish touch.

Still further, the titanium oxide sol of the present invention also exhibits excellent effects when it is used in the field where specific particle configuration characteristics of the titanium oxide particles dispersed in the sol are employed to the best advantage.

For instance, when the present titanium oxide sol is used in the manufacture of molded products such as catalysts or catalyst carriers, the titanium oxide particles are regularly arranged by the force applied thereto at the time of molding process, whereby moldability of the charged molding material containing this sol is markedly improved and, at the same time, the resulting molded products are improved in compression strength and abrasion strength without forming cracks at the time when the molded products are dried or calcined. Furthermore, when the present titanium oxide sol is previously treated with another sol or liquid of titania, silica, alumina or the like to form an agglomerate and when this agglomerate is used as a material for molding a molded product, there can be obtained a molded product which is high in porosity and which, in spite of lightness in weight, is excellent in compression strength, abrasion strength and impact strength. In general, where the titanium oxide sol of the present invention is used for the purpose of forming molded products, there is obtained a marked effect when the sol containing titanium oxide particles of $L/D \geq 7$ is used singly or when two or more sols different in configuration of the particles are used in combination.

The present invention is illustrated below with reference to examples, but it should be construed that the invention is in no way limited to those examples.

EXAMPLE 1

Titanium sulfate was dissolved in pure water to obtain an aqueous solution containing 0.4% by weight of the sulfate calculated as $TiO_2$. To this aqueous solution was gradually added with stirring a 15% ammonia water to obtain a white slurry having a pH 8.5. This slurry was filtered and washed to obtain a cake of hydrated titanium oxide gel having a solid concentration of 9% by weight.

To 5.55 kg of the cake thus obtained were added 6.06 kg of 33% hydrogen peroxide solution and 13.4 kg of pure water, and the mixture was then heated for 5 hours at 80° C. to obtain 25 kg of a solution containing 2.0% by weight of titanic acid calculated as $TiO_2$. This aqueous titanic acid solution obtained was transparent yellowish brown and had a pH 8.1.

Subsequently, a mixture comprising 130 g of silica sol containing silica particles having a particle diameter of 7 m$\mu$ and the silica concentration of 15% by weight, 9 kg of the above-mentioned aqueous titanic acid solution and 10.8 kg of pure water was heated for 624 hours at 95° C. The solution obtained was a yellowish brown at the outset, but this solution became a transparent, semi-translucent colloidal solution after the completion of 624-hour heating thereof.

The colloidal solution thus obtained was concentrated by a vacuum evaporation technique to obtain a sol as denoted in Table 1.

Table 1 shows properties of the sol thus obtained and of the particles dispersed therein.

EXAMPLE 2

There was obtained a titanium oxide sol as shown in Table 1, following substantially the same procedure as described in Example 1 except that the amount of the pure water to be mixed with 130 g of the silica sol and 9 kg of the aqueous titanic acid solution was changed to 1.0 kg, the heating temperature was changed to 130° C. and the heating time was changed to 11 hours.

EXAMPLE 3

The aqueous titanic acid solution and silica sol of Example 1 were mixed with pure water so that $TiO_2/SiO_2=1.8$ and the solids concentration ($TiO_2+SiO_2$) of 0.1% by weight were attained, and the mixture was heated for 48 hours at 95° C. Thereafter, to the mixture maintained at 95° C. was added portionwise over a period of 60 hours the above-mentioned aqueous titanic acid solution diluted so as to contain 0.1% by weight of titanic acid calculated as $TiO_2$ until $TiO_2/SiO_2=7.2$ was attained. Thereafter, that temperature was maintained for 48 hours.

Figure 2:
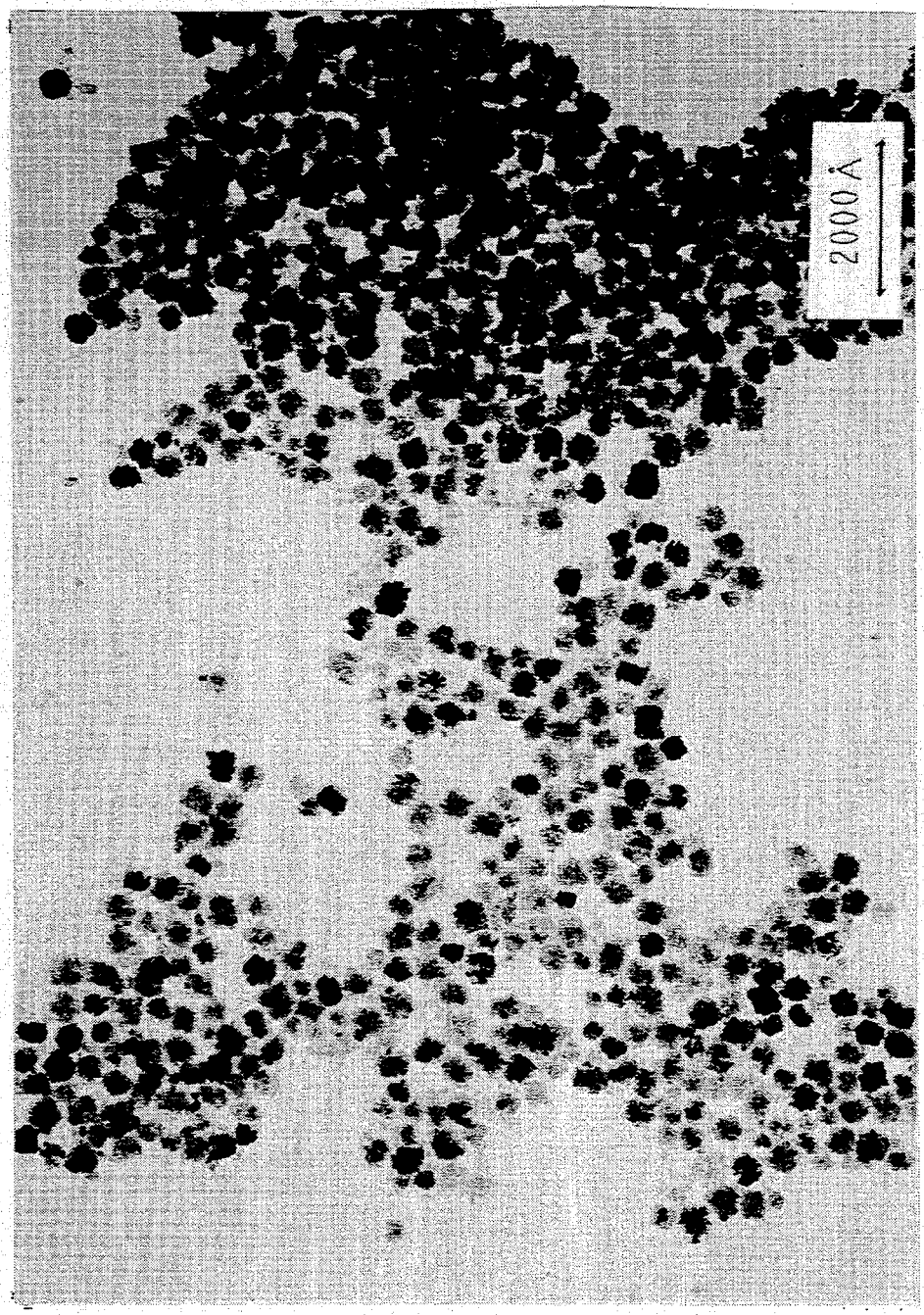
FIGS. 2-4 are electron microscope photographs of the titanium oxide particles of the present invention.

Properties of the sol obtained after concentration are shown in Table 1. Furthermore, FIG. 2 shows an electron microscope photograph of titanium oxide particles dispersed in this sol.

EXAMPLE 4

The aqueous titanic acid solution and silica sol of Example 1 were mixed with pure water so that $TiO_2/SiO_2=6.5$ and the solids concentration of 2.0% by weight were attained, and the mixture was heated for 60 hours at 95° C. Thereafter, to the mixture maintained at 95° C. was added portionwise over a period of 60 hours the above-mentioned aqueous titanic acid solution (2.0% by weight) until $TiO_2/SiO_2=15$ was attained. That temperature was maintained thereafter for 60 hours.

Properties of the sol obtained after concentration are shown in Table 1.

EXAMPLE 5

Titanium chloride was dissolved in pure water to obtain an aqueous solution containing 5.0% by weight of the chloride calculated as $TiO_2$. To this aqueous solution was added gradually with stirring 15% ammonia water to obtain a white slurry having a pH 8.5. This slurry was filtered and then washed to obtain a cake of hydrated titanium oxide gel having a solid content of 10% by weight.

To 5.0 kg of this cake obtained were added 5.71 kg of a 35% hydrogen peroxide solution and 14.0 kg of pure water, and the mixture was then heated for 3 hours at 80° C. to obtain a solution containing 2.0% by weight of titanic acid calculated as $TiO_2$. The aqueous titanic acid solution obtained was transparent and yellowish brown and had a pH of 8.4.

Subsequently, a titanium oxide sol as shown in Table 1 was prepared by repeating substantially the same procedure as in Example 1 except that a mixture comprising 66.7 g of silica sol containing silica particles of a particle diameter of 7 mμ and the silica concentration of 15% by weight, 200 g of the aqueous titanic acid solution obtained above and 1.147 kg of pure water was heated at a temperature of 150° C. for a period of 300 hours.

EXAMPLE 6

A titanium oxide sol as shown in Table 1 was prepared by repeating substantially the same procedure as in Example 1 except that the aqueous titanic acid solution and silica sol of Example 5 were mixed with pure water so that $TiO_2/SiO_2=2.5$ and the solid concentration of 1.6% by weight were attained, and the mixture was heated for 70 hours at 168° C.

EXAMPLE 7

Figure 3:

A mixture comprising 9 kg of the aqueous titanic acid solution and 130 g of the silica sol of Example 1 and 191 g of pure water was heated for 60 hours at 95° C. Thereafter, the mixture was concentrated in the same manner as in Example 1 to obtain a titanium oxide sol as shown in Table 1. Furthermore, FIG. 3 shows an electron microscope photograph of the titanium oxide particles obtained in the titanium oxide sol thus prepared.

EXAMPLE 8

A mixture comprising 1.0 kg of the aqueous titanic acid solution obtained in Example 1 and 200 kg of pure water was heated for 2 hours at 95° C. to obtain a titanium oxide sol containing 0.01% by weight of titanic acid calculated as $TiO_2$. A titanium oxide sol as shown in Table 1 was obtained by repeating substantially the same procedure of hydrolysis as in Example 7 except that in place of 130 g of the silica sol, there was used 130 g of the titanium oxide sol obtained above.

EXAMPLE 9

A flask equipped with a reflux condenser was charged with 50 kg of an aqueous zirconium chloride solution containing 0.036% by weight of zirconium chloride calculated as $ZrO_2$, and thereto was added gradually with thorough stirring 2.9 kg of 0.1N ammonia water. The mixture was further heated for 50 hours at 95° C., whereupon a pale semitranslucent sol having a zirconium oxide concentration of 0.034% by weight and a pH 1.8 was obtained.

After adjusting this sol to pH 4.8 by the addition of 0.1N ammonia water, the sol was washed with pure water until no chloride ion was detected in the washing solution.

The zirconia sol obtained above and the aqueous titanic acid solution of Example 1 were mixed so that $TiO_2/ZrO_2=10$ was attained, and the mixture was charged with pure water so that a solid concentration ($TiO_2+ZrO_2$) became 0.1% by weight, followed by heating for 60 hours at 95° C. The sol obtained was concentrated to obtain such a sol as shown in Table 1.

EXAMPLE 10

Titanium sulfate was dissolved in pure water to obtain an aqueous solution containing 5.0% by weight of titanium sulfate calculated as $TiO_2$. This aqueous solution was charged with ferric sulfate so that $TiO_2/Fe_2O_3=97/3$ (weight ratio) was attained. To this aqueous solution was added gradually with stirring a 15% ammonia water to obtain a light brown slurry having a pH 8.7. This slurry was filtered and washed to obtain a cake of hydrated titanium oxide gel having the solids concentration ($TiO_2+Fe_2O_3$) of 10% by weight.

A mixture comprising 5.0 kg of the cake obtained above, 5.71 kg of 35% hydrogen peroxide solution and 14.0 kg of pure water was heated for 3 hours at 80° C. to obtain 25 kg of solution containing 1.94% by weight of titanic acid calculated as $TiO_2$. This aqueous titanic acid solution was clear light brown and had a pH 8.4.

Subsequently, a thorough mixture comprising 25 kg of the solution obtained above and 460 kg of pure water was heated for 8 hours at 130° C. At the outset, this solution was pale light brown, but it became a clear pale yellowish white sol after the completion of 8-hour heating. The sol obtained was concentrated to obtain such a sol as shown in Table 1.

EXAMPLE 11

The aqueous titanic acid solution of Example 1 and potassium stannate were mixed with pure water so that $TiO_2/SnO_2 = 9/1$ (weight ratio) and a solid concentration ($TiO_2 + SnO_2$) of 0.1% by weight were attained, and the mixture was heated for 5 hours at 130° C. At the outset, the mixture was yellowish brown, but it became a clear semitranslucent sol.

The sol thus obtained was concentrated to obtain such a sol as shown in Table 1.

EXAMPLES 12 TO 14

Example 7 was repeated to effect the same hydrolysis as in Example 7 except that the $TiO_2/SiO_2$ (weight ratio) employed was 20 (Example 12), 30 (Example 13) and 80 (Example 14), respectively, whereby such titanium oxide sols as shown in Table 1 were obtained.

Figure 4:

FIG. 4 shows an electron microscope photograph of the titanium oxide particles obtained in Example 13.

EXAMPLE 15

To the titanium oxide sol obtained, prior to concentration, in Example 13 was added the aqueous titanic acid solution obtained in Example 1 so that $TiO_2/SiO_2 = 130$ and a solid concentration of 0.1% by weight were attained, and the mixture was heated for 84 hours at 100° C. The sol thus obtained was concentrated to obtain such a sol as shown in Table 1.

EXAMPLE 16

The silica sol and the aqueous titanic acid solution of Example 1 were mixed together so that $TiO_2/SiO_2 = 30$ and a solid concentration of 1.0% by weight were attained, and the mixture was heated in an autoclave for 2 hours at 130° C. to obtain a semitranslucent sol. This sol was concentrated to obtain such a sol as shown in Table 1.

EXAMPLE 17

The titanium oxide sol obtained in Example 2 was diluted with pure water to adjust the $TiO_2$ concentration of the diluted solution to 0.005% by weight (sample A), and the titanium oxide sol obtained in Example 7 was treated likewise to adjust the $TiO_2$ concentration in the diluted solution to 0.005% by weight (Sample B). The samples A and B were individually measured for absorbance in ultraviolet region (less than 400 nm) and for transmittance in visible light region (more than 400 nm).

For comparison's sake, titanium oxide particles (Aerosil P-25 produced and sold by Degussa Co.) obtained by vapor phase oxidation of titanium chloride were dispersed in pure water so that the $TiO_2$ concentration became 0.005% by weight (sample C). For the sample C, the same measurement as above was conducted. The results obtained are shown in FIG. 1. In the figure, A, B and C each represents absorbance, and A', B' and C' each represents transmittance. The measurement was conducted by using a spectrophotometer (330 Model manufactured and sold by Hitachi, Ltd.).

Comparative Example 1

The hydrated titanium oxide gel obtained in Example 1 was diluted with pure water to obtain a suspension having a $TiO_2$ concentration of 2.0% by weight. To this suspension was added gradually 0.1N of hydrochloric acid until the suspension became a sol. The sol obtained was stabilized by heating for 1 hour at 80° C., and thereafter the water content of the sol was evaporated under reduced pressure to obtain a concentrated sol by the deflocculation method. This sol could be concentrated up to 20% by weight, but it had a low pH as low as 1.7 and also contained a large amount of chlorine ions as large as 2.1% by weight. The characteristics of this sol are shown in Table 1.

Figure 5:
FIG. 5 is an electron microscope photograph of the titanium oxide particles obtained in the comparative example.

FIG. 5 shows an electron microscope photograph of the titanium oxide particles obtained in this sol.

TABLE 1

| | Properties of sol | | | | Properties of particles dispersed | | | | | | | |
|---|---|---|---|---|---|---|---|---|---|---|---|---|
| | Concentration after concentrated (wt. %) | pH | Impurities (wt. %) | State of being mixed with solvent (IPA) | Major axis (mμ) | Minor axis (mμ) | L/D | σ (mμ) | σ/L_A × 100 (%) | Percent of particles within the range of [1 ± 0.3] (L/D)_A | Specific surface area (m²/g) | Crystal form | Diameter of crystal (Å) |
| Ex. 1 | 12.9 | 5.6 | | Stable | 25.1 | 23.0 | 1.1 | 5.0 | 19.9 | 95 | 191 | Anatase | 300 |
| 2 | 15.1 | 6.1 | Na+ < 0.01 | Stable | 4.8 | 4.1 | 1.2 | 1.4 | 29.2 | 100 | 185 | | 100 |
| 3 | 15.3 | 5.5 | SO_4 < 0.01 | Stable | 40.5 | 40.2 | 1.0 | 6.0 | 14.8 | 85 | 162 | | 280 |
| 4 | 14.7 | 6.3 | Cl⁻ < 0.01 | Stable | 15.1 | 15.1 | 1.0 | 4.0 | 26.5 | 85 | 170 | | 250 |
| 5 | 27.8 | 7.4 | | Stable | 37.4 | 28.8 | 1.4 | 5.0 | 13.4 | 88 | 168 | | 118 |
| 6 | 35.1 | 8.1 | | Stable | 53.2 | 29.6 | 1.8 | 5.5 | 10.3 | 93 | 161 | | 141 |
| Ex. 7 | 14.0 | 6.8 | | Stable | 41.7 | 12.2 | 3.4 | 4.5 | 10.8 | 100 | 220 | Anatase | 420 |
| 8 | 14.8 | 8.8 | | Stable | 57.3 | 11.0 | 5.2 | 4.5 | 7.9 | 75 | 168 | | 99 |
| 9 | 14.3 | 8.0 | | Stable | 50.9 | 12.9 | 3.9 | 3.5 | 6.9 | 80 | 170 | | 97 |
| 10 | 13.5 | 8.4 | Na+, K+ < 0.01 | Stable | 155.8 | 48.1 | 3.2 | 18.0 | 11.6 | 93 | 153 | | 123 |
| 11 | 12.1 | 10.3 | SO_4 < 0.01 | Stable | 88.5 | 35.1 | 2.5 | 10.0 | 11.3 | 88 | 161 | | 107 |
| 12 | 15.1 | 5.5 | Cl⁻ < 0.05 | Stable | 55.0 | 14.1 | 3.9 | 5.0 | 9.1 | 100 | 197 | | 97 |

TABLE 1-continued

| | Properties of sol | | | | Properties of particles dispersed | | | | | | | |
|---|---|---|---|---|---|---|---|---|---|---|---|---|
| | Concentration after concentrated (wt. %) | pH | Impurities (wt. %) | State of being mixed with solvent (IPA) | Major axis (mμ) | Minor axis (mμ) | L/D | σ (mμ) | σ/L$_A$ × 100 (%) | Percent of particles within the range of [1 ± 0.3] (L/D)$_A$ | Specific surface area (m²/g) | Crystal form | Diameter of crystal (Å) |
| 13 | 15.0 | 5.7 | | Stable | 74.0 | 12.1 | 6.2 | 7.5 | 10.1 | 100 | 143 | | 480 |
| 14 | 12.3 | 5.4 | | Stable | 193.2 | 16.1 | 12.0 | 17.5 | 9.1 | 85 | 113 | | 154 |
| 15 | 13.6 | 5.2 | | Stable | 360.0 | 17.5 | 20.6 | 30.2 | 8.4 | 80 | 89 | | 300 |
| 16 | 15.3 | 6.3 | | Stable | 81.5 | 14.3 | 5.7 | 7.5 | 9.2 | 100 | 149 | | 100 |
| Co.* Ex. 1 | 20.0 | 1.7 | Cl⁻: 2.1 wt % | Gel | Agglomerate | | | | | — | 201 | Anatase | 89 |

*Comparative

What is claimed is:

1. A titanium oxide sol which comprises a disperse medium and titanium oxide, said titanium oxide consisting of generally rectangular, non-spherical particles of titanium oxide dispersed in the disperse medium, each particle of said titanium oxide having a crystalline form of anatase and a major axis of a length L ranging from 4 to 500 mμ and a minor axis of a length D ranging from 4 to 100 my with the proviso that L is not smaller than D, said particles having such a size distribution that a value of $(\sigma/L_A) \times 100$ is not in excess of 30 (%) wherein L$_A$ is an average value of L and a is a standard deviation of L and such a configuration distribution that at least 60% of all the particles have a value of L/D within the range between $(1-0.3) \times (L/D)_A$ and $(1+0.3) \times (L/D)_A$ wherein $(L/D)_A$ is an average value of L/D of all the particles and wherein said titanium sol is produced by adding hydrogen peroxide to a gel or sol of hydrated titanium oxide to dissolve the hydrated titanium oxide in said gel or sol, and heating the resulting aqueous titanic acid solution in the presence of an inorganic compound.

2. A titanium oxide sol which comprises a disperse medium and titanium oxide, said titanium oxide consisting of generally rectangular, non-spherical particles of titanium oxide dispersed in the disperse medium, each particle of said titanium oxide having a crystalline form of anatase and a major axis of a length L ranging from 4 to 500 mμ and a minor axis of a length D ranging from 4 to 100 mμ with the proviso that L is not smaller than D, said particles having such a size distribution that a value of $(\sigma/L_A) \times 100$ is not in excess of 30 (%) wherein L$_A$ is an average value of L and σ is a standard deviation of L and such a configuration distribution that at least 60% of all the particles have a value of L/D within the range between $(1-0.3) \times (L/D)_A$ and $(1+0.3) \times (L/D)_A$ wherein $(L/D)_A$ is an average value of L/D of all the particles.

3. The titanium oxide sol as claimed in claim 1, wherein the inorganic compound is one or more of the inorganic compounds of metals belonging to groups II, III, IV, V, VI and VIII of the Periodic Table.

* * * * *